Dec. 9, 1924.  1,518,141
H. P. GAGE
HEAT ABSORBING DEVICE
Filed Jan. 26, 1923
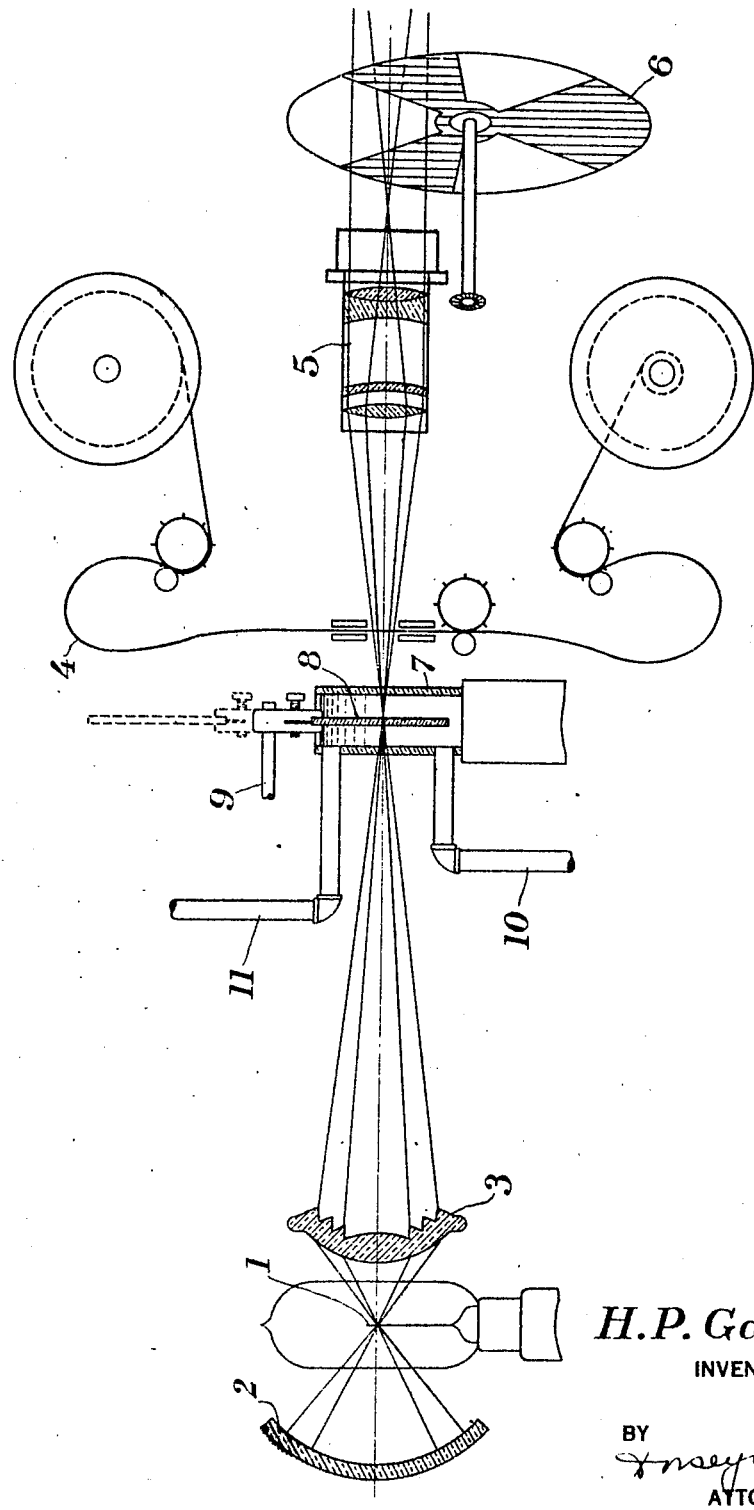
H. P. Gage
INVENTOR
BY
ATTORNEY Patented Dec. 9, 1924.

1,518,141

UNITED STATES PATENT OFFICE.

HENRY PHELPS GAGE, OF CORNING, NEW YORK, ASSIGNOR TO CORNING GLASS WORKS, OF CORNING, NEW YORK, A CORPORATION OF NEW YORK.

HEAT-ABSORBING DEVICE.

Application filed January 26, 1923. Serial No. 615,174.

*To all whom it may concern:*

Be it known that I, HENRY PHELPS GAGE, a resident of Corning, in the county of Steuben and State of New York, have invented certain new and useful Improvements in Heat-Absorbing Devices, of which the following is a specification.

This invention relates to heat-absorbing devices especially adapted for use in connection with projecting apparatus wherein it is desired to reduce as far as possible, the radiant energy contained in a beam projected from a light source onto an object intended to be viewed, or an image of which is to be projected on a screen. A familiar illustration of a device of the character to which this invention may be applied is the moving picture projector in which a concentrated beam from an artificial light source is projected upon an inflammable film. This film absorbs certain of the radiant energy contained in the beam falling on it, and thereby becomes heated, and unless kept in rapid motion, will ignite. The importance therefore of producing adequate illumination by a beam containing as small amount of radiant energy as possible is therefore apparent.

My invention contemplates a selection of material for the light filter, whereby a high energy absorption with a minimum of light absorption is given to the device, at the same time, providing for the proper dissipation of heat resulting from the absorption of energy by the elements of the system.

Referring to the accompanying drawings which represent a moving picture projector apparatus embodying my invention, a suitable light source 1, preferably in the form of an incandescent electric lamp is so located with respect to the mirror 2 and condenser 3, that a concentrated beam of light is thrown on the moving picture film 4 to illuminate the same for projection by the optical system 5, as controlled by the shutter 6. All of these elements may be of the usual and well known construction. In the path of the beam and between the condenser and the film 4, I locate a water cell 7 and a screen in the form of a glass plate 8. As is well known, a water cell is one centimetre or more in thickness, completely absorbing radiant energy of wave lengths of a greater length than 1.5 microns, without causing appreciable absorption of radiant energy within the limits of the visible spectrum. Such water cells have heretofore been used in projecting apparatus.

Nearly one-half, however of the total radiant energy contained in the rays falling on the water, pass through it, part of the rays so passing being infra-red rays, or so called heat rays, not useful in illumination but containing energy.

I have found that by causing the concentrated beam not only to pass through such a water cell, but through a screen having high absorption for rays between the end of the visible red (wave length .77 microns) and 1.5 microns (where the absorption of water become effective), I am enabled to absorb the maximum energy from the beam without too greatly reducing the portion of radiant energy within the visible limits which contribute to luminosity.

A glass suitable for the screen is the "Corning" glass G-124J, the characteristics of which are described in Technologic paper No. 93 of the Bureau of Standards.

In order to avoid light losses by the multiplicity of reflecting surfaces introduced by the water cell and the screen, it is desirable that at least one face of the screen be in contact with the water, which may be done by making one, or both of the panes of the water cell of the desired absorptive glass. However, it may be more convenient to immerse the screen within the water cell itself, as by so doing, the screen may be removed from the path of the projected beam during such times as moving pictures are being projected, and be put into the path of the beam in still picture projection. For this purpose, the screen may be carried by an arm 9 to permit the desired movement of the screen into the path of the beam when the film is arrested.

Obviously, a proper circulating system represented by the intake pipe 10, and exit pipe 11, may be supplied for the water cell, in order that the water therein may be kept cool, in spite of absorption of energy from the rays, by both the water and the screen.

Having thus described my invention what I claim as new, and desire to secure by Letters Patent is:—

1. In a light filter, the combination with a water layer having an absorption of wave lengths greater than 1.5 microns, and a screen of a glass having selective absorption for wave lengths between .77 microns and 1.5 microns.

2. In a light filter, the combination with a liquid layer having a selective absorptive power for wave lengths longer than 1.5 microns, and a screen having a selective absorptive power for wave lengths from .77 microns to 1.5 microns, one face at least of the screen being in contact with the liquid.

3. In a light filter, the combination with a liquid layer having a selective absorptive power for wave lengths longer than 1.5 microns, and a screen having a selective absorptive power for wave lengths from .77 microns to 1.5 microns, the screen being immersed in the liquid.

In testimony whereof, I hereunto sign my name.

HENRY PHELPS GAGE.